UNITED STATES PATENT OFFICE 2,647,894
2-CHLOROPROCAINE SALT OF PENICILLIN O

Jared H. Ford, Kalamazoo, Mich., assignor to The Upjohn Company, Kalamazoo, Mich., a corporation of Michigan No Drawing. Application July 28, 1950, Serial No. 176,525

1 Claim. (Cl. 260—239.1)

This invention relates to a 2-chloroprocaine salt of penicillin O.

Penicillin O is allylmercaptomethylpenicillin, which is represented by the formula:

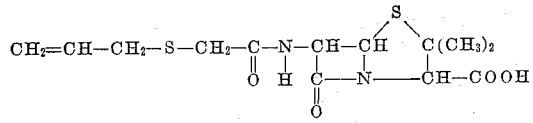

It differs from penicillin G in that the benzyl group of penicillin G has been replaced by an allylmercaptomethyl group.

The purification of penicillin O prior to the present invention presented a difficult problem. Methods which had theretofore been successfully used for the purification of other penicillins, such as penicillin G, X and K (The Chemistry of Penicillin, Princeton University Press, Princeton, New Jersey (1949), Chapter V) gave little or no purification when applied to crude penicillin O.

Penicillin O can be obtained in a high degree of purity by the use of partition chromatography on a silica gel base using ether and a phosphate buffer with a pH of 6.2. However, this method is unsuitable for the commercial preparation of penicillin O because of the large amounts of ether and silica which are required, because of the large number of steps involved, and because of the losses of penicillin O by inactivation during the process.

It has now been found that crude penicillin O can be purified very effectively by converting it in solution to a salt with a dialkylaminoalkyl 4-aminobenzoate or a nuclearly halogen-substituted dialkylaminoalkyl 4-aminobenzoate and crystallizing from the solution the salt thus formed. From "crude" penicillin O preparations containing from 17 to 80 percent of penicillin O, salts of penicillin O can be obtained in accordance with the method of this invention which have a degree of purity of at least 90 percent, which represents a substantial purification of the penicillin O.

Diethylaminoethyl 4-aminobenzoate (procaine) and diethylaminoethyl 2-chloro-4-aminobenzoate (hereinafter referred to as 2-chloroprocaine, which conform to the generic formula $H_2NC_6H_3XCOOCH_2CH_2N(C_2H_5)_2$ in which X is hydrogen or a halogen (chlorine, bromine and iodine in the 2 or 3 position in the ring) are especially useful basic esters for forming salts with penicillin O and effecting the purification process of the present invention. Although all basic esters conforming to this formula are satisfactory for use in the purification of penicillin O, 2-chloroprocaine is preferred since its salt with penicillin O is less soluble in water than, for example, the procaine salt of penicillin O and a higher recovery of penicillin O can thereby be effected in each purification stage. For certain other purposes also, such as for therapeutic parenteral administration, the 2-chloroprocaine salt is preferred over the procaine and other basic ester salts.

A preferred embodiment of the process of this invention comprises the steps of preparing an aqueous solution of an alkali-metal salt of penicillin O, adding thereto a water-soluble acid salt of the base, either in solid form or in aqueous solution, seeding the solution with a small quantity of previously prepared penicillin O salt (if necessary, or to hasten the crystallization), chilling the solution, separating the salt of penicillin O which has precipitated, and drying the product. Although the foregoing method for the preparation of the penicillin O salt is preferred, other methods for the formation of similar salts of organic acids and organic bases can also be used.

Alkali-metal salts of penicillin O which are to be purified in accordance with the process of this invention are preferably added as concentrated solutions in water in order to diminish losses due to the solubility in the reaction mixture of the resulting salts of the basic ester and penicillin O. The crude alkali-metal salt of penicillin O is stirred in water, using about 1 to 5 milliliters of water per gram of solid. After stirring for several minutes, any water-insoluble impurities are removed by filtration or other methods and the hydrochloride or other acid salt of the selected basic ester is added to the solution. The hydrochloride or other acid salt of the basic ester may be added directly to the penicillin O solution as a solid and dissolved therein with stirring or it may be added as a concentrated aqueous solution.

The amount of the hydrochloride or other acid salt of the basic ester which is added is determined by the penicillin content of the crude penicillin. From about 0.9 mole to about 2.0 moles of the hydrochloride per mole of the penicillin can be used, although approximately 10 percent in excess of the theoretical (stoichiometrical) amount is preferably added. The composition of the salt shows it to be formed from equimolecular proportions of the two reactants. Acid salts of the basic esters, which may be used in place of the hydrochlorides, include the sulfates, citrates and water-soluble addition salts with other acids.

The reactants may be mixed at temperatures ranging from the freezing point of the solution to about 35 to 45 degrees centigrade, although a temperature within the range of approximately 15 to approximately 25 degrees centigrade is preferred. After mixing the reactants, seed crystals may be added to start or to hasten the crystallization.

After formation of the penicillin O salt, it is desirable to cool the mixture to between approximately 0 and approximately 10 degrees centigrade before separating the precipitated salt, in order to precipitate further amounts of the salt and thereby minimize losses due to its solubility.

The procaine and 2-chloroprocaine salts of penicillin O can be converted to other salts, for example, by acidification and extraction of the resulting penicillin O as the free acid with an organic solvent, and neutralization of the free acid with the desired base, according to conventional methods.

Crude penicillin O from various sources may be purified in accordance with the process of this invention. A crude penicillin O (Behrens et al., J. Biol. Chem., 175, 803 (1948)), isolated by the carbon-acetone process (Whitmore et al., Ind. Eng. Chem., 38, 942 (1946)) from a fermentation carried out in a resin-lined tank using a synthetic medium containing the precursor compound, allylmercaptoacetic acid, such as described by Stone and Farrel, in Science, 104, 445 (1946), that has been inoculated with Culture Q-176 of the *Penicillium notatum* organism is especially adapted to purification by treatment in accordance with the present process. In preparing penicillin O in such manner, allylmercaptoacetic or N - (2-hydroxyethyl)-allylmercaptoacetamide can be used as precursors at a concentration of approximately 250 milligrams per liter.

Crystals of procaine penicillin O and 2-chloroprocaine penicillin O suitable for use for seeding can be prepared from a highly purified sample of potassium penicillin O which had been chromatographed by the method described by Ford et al. in J. Am. Chem. Soc., 70, 3522 (1948) for obtaining the potassium salt of gamma-chlorocrotylmercaptomethyl-penicillin.

The following examples disclose properties of the new salts and illustrate in greater detail preferred methods of practicing the process of the invention.

*Example 1.—Salt of penicillin O and 2-chloroprocaine*

A solution of 13.0 grams of the potassium salt of penicillin O (prepared by a method analogous to that described by Ford et al., loc. cit.) in 50 milliliters of water was added to a solution of 11.5 grams of diethylaminoethyl 2-chloro-4-aminobenzoate (2-chloroprocaine) hydrochloride in 115 milliliters of warm water. Within a few minutes, crystals of the 2-chloroprocaine salt of penicillin O began to separate. After standing at 5 degrees centigrade for several hours, the crystals were filtered, washed with cold water, and dried. The yield of 2-chloroprocaine penicillin O was 21.6 grams (93 percent), and its melting point was 79–81 degrees centigrade (Koffler hot stage). The elementary analyses and the assay of this preparation for penicillin O, as tabulated hereinbelow, indicate that the salt is a monohydrate:

Analysis:
Calculated for $C_{26}H_{37}N_4O_6S_2Cl.H_2O$: C, 50.43; H, 6.35.
Found: C, 50.62; H, 6.50.

Assay:
Calculated for penicillin O: 949 Oxford units per milligram
Found by hydroxylamine assay (Ford, Analytical Chemistry, 19, 1004 (1947)): 920 Oxford units per milligram
Found by *S. aureus* plate assay: 872 Oxford units per milligram

*Example 2*

A solution of 205 milligrams of crude potassium salt of penicillin O have 58.6 percent of theoretical potency, as determined by hydroxylamine assay, was mixed with a solution of 100 milligrams of 2-chloroprocaine hydrochloride in 1 milliliter of water. Upon stirring and seeding, crystals of the 2-chloroprocaine salt of penicillin O separated from solution in the form of slender needles. After standing overnight in a refrigerator, the crystals were filtered, washed with a few drops of cold water and dried. The yield of 2-chloroprocaine penicillin O which was found to have full theoretical potency by hydroxylamine assay was 182.3 milligrams (90 percent).

*Example 3.—Salt of penicillin O and procaine*

A solution of 100 milligrams of analytically pure potassium salt of penicillin O in 1 milliliter of water was mixed with a solution of 85 milligrams of procaine hydrochloride in 0.6 milliliter of water. Upon scratching the sides of the container with a glass rod, crystals were deposited from the solution. After filtering, washing with water, and drying over phosphorus pentoxide at 0.02 millimeter pressure, 83 milligrams of the procaine salt of penicillin O was obtained as the monohydrate. The product melted with decomposition at 85–100 degrees centigrade; its melting point is dependent upon the rate of heating. Elementary analyses yielded the following results:
Calculated for $C_{26}H_{38}N_4O_6S_2.H_2O$: C, 53.40; H, 6.89. Found: C, 53.50; H. 6.90.

*Example 4*

Five grams of crude penicillin O having a dark brown color and a purity of 17 percent by hydroxylamine assay was stirred with 10 milliliters of water at 25 degrees centigrade for several minutes and filtered to remove a small amount (0.35 gram) of a water-insoluble impurity. One gram of procaine hydrochloride was dissolved in the filterate by stirring. The resulting clear solution was seeded with procaine penicillin O and placed in a refrigerator. After standing overnight, the crystalline precipitate was filtered, washed with a small amount of cold water, and dried. The yield of nearly white procaine penicillin O was 0.90 gram (60 percent) which was found to have a purity of 92 percent by hydroxylamine assay. This represents a recovery of 55.2 percent of the penicillin O that was present in the crude starting material.

Although the foregoing specification comprises preferred embodiments of the invention, it is to be understood that the invention is not limited to the exact details shown and described, and that variations and modifications may be made in conventional manner without departing from the scope of the invention as defined in the appended claim.

I claim:
The diethylaminoethyl 2-chloro-4-aminobenzoate salt of allylmercaptomethyl penicillin.

JARED H. FORD.

References Cited in the file of this patent

UNITED STATES PATENTS

| Number | Name | Date |
|---|---|---|
| 2,528,175 | Rhodehamel | Oct. 31, 1950 |
| 2,547,782 | Rhodehamel | Apr. 3, 1951 |